United States Patent [19]

Fuller

[11] Patent Number: 4,927,016

[45] Date of Patent: May 22, 1990

[54] SPINNER BAIT BOX AND STORAGE SYSTEM

[76] Inventor: Jimmie G. Fuller, 113 W. Davies St., Anna, Ill. 62906

[21] Appl. No.: 338,886

[22] Filed: Apr. 17, 1989

[51] Int. Cl.$^5$ ............................................. B65D 85/00
[52] U.S. Cl. ................................................ 206/315.11
[58] Field of Search ................ 206/315.11, 425, 455, 206/456

[56] References Cited

U.S. PATENT DOCUMENTS

| | | | |
|---|---|---|---|
| 2,864,491 | 12/1958 | Paterson | 206/456 |
| 3,399,939 | 9/1968 | Anderson | 312/244 X |
| 3,628,843 | 12/1971 | Wynne et al. | 206/315.11 X |
| 3,638,843 | 2/1972 | Ortynski | 206/315.11 |
| 3,710,900 | 1/1973 | Fink | 206/456 X |
| 3,769,741 | 11/1973 | Hessler et al. | 206/315.11 X |
| 4,326,630 | 4/1982 | Bacino et al. | 206/315.11 |
| 4,516,707 | 5/1985 | Crapaunuse | 234/282 |
| 4,629,066 | 12/1986 | Howard | 206/425 X |
| 4,691,469 | 9/1987 | Alsobrook | 43/54.1 |
| 4,695,103 | 9/1987 | MacDonald et al. | 206/425 X |
| 4,744,614 | 5/1988 | Gombosi | 312/242 |

FOREIGN PATENT DOCUMENTS 1179099 12/1958 France ........................ 206/455

Primary Examiner—William Price
Attorney, Agent, or Firm—Don W. Weber

[57] ABSTRACT

A spinner bait box and storage system is presented which enables a fisherman to conveniently store spinner baits and lures and to arrange them in specific categories. The spinner bait box is rectangular in shape and has front and back vertical side walls and end walls. On the inside of the front and back vertical walls are a number of corresponding projecting ridges which create individual spinner bait packet spaces. The individual spinner bait packets have a stiff back and a pliable clear plastic front which, when connected, form a pocket for spinner baits and lures. Each packet has a mouth at the top for easy insertion of the spinner baits. The spinner bait packets may be arranged in the packet spaces in any suitable manner and categorized by means of a tabbed index card which may also be placed in an appropriate packet space. The spinner bait box may have a hinged and latched lid and carrying handle. The spinner bait box may also be made so as to be placed inside of a conventional fishing tackle box.

5 Claims, 1 Drawing Sheet

U.S. Patent   May 22, 1990   4,927,016
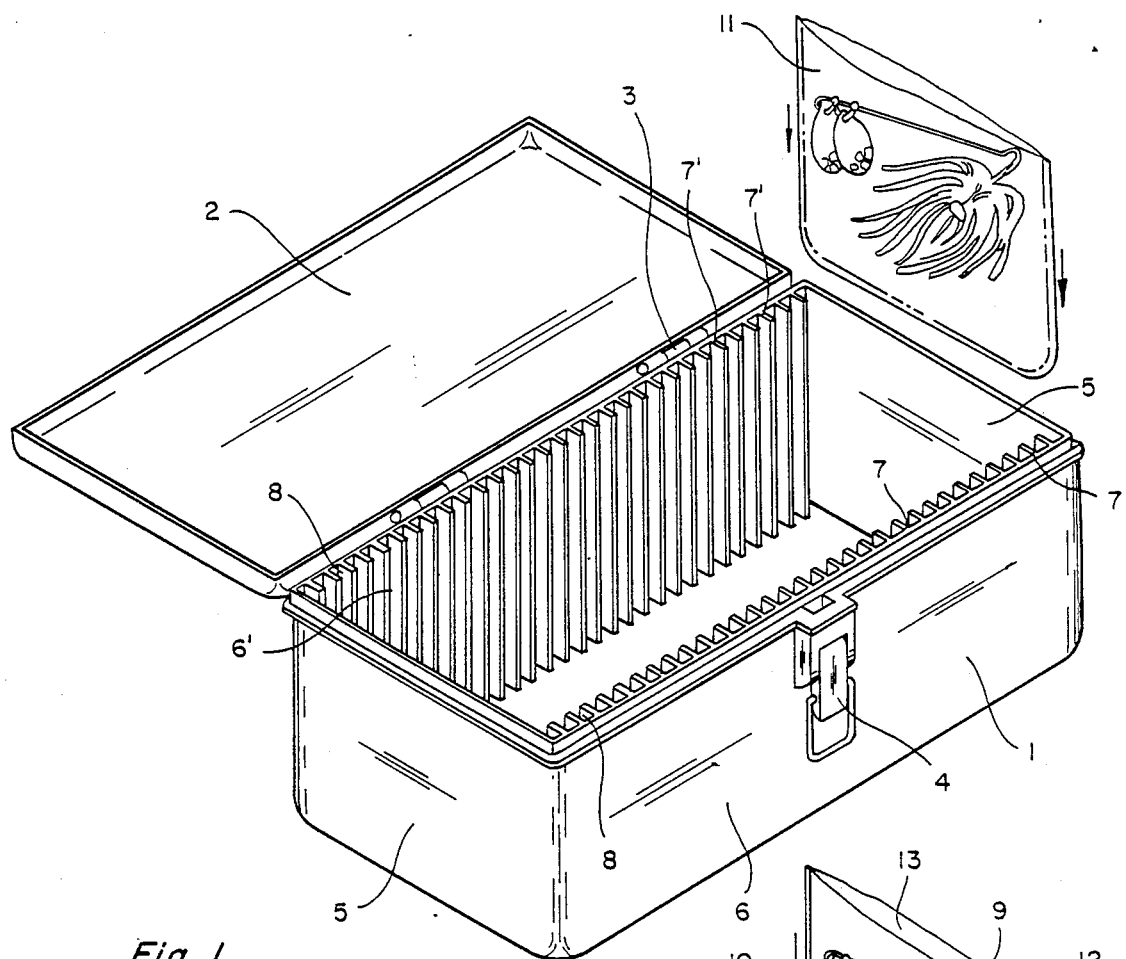
Fig. 1
Fig. 3
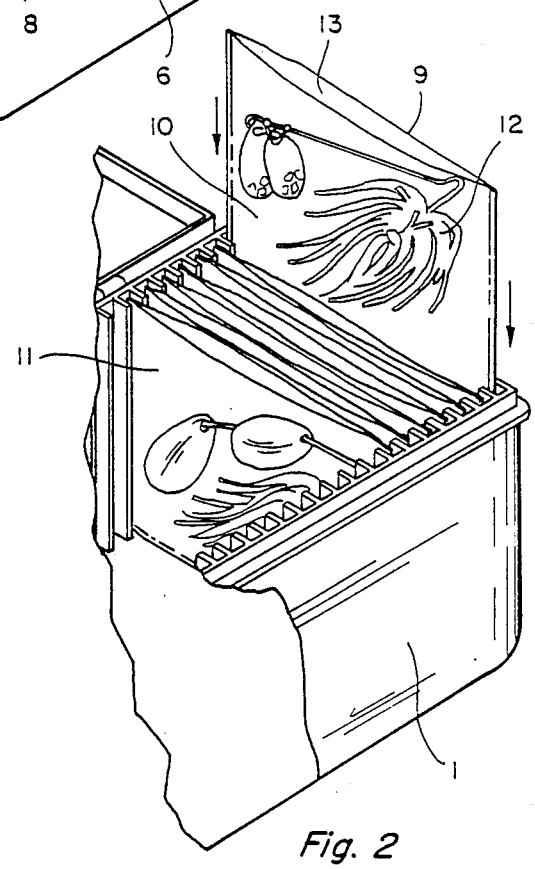
Fig. 2

SPINNER BAIT BOX AND STORAGE SYSTEM

BACKGROUND OF THE INVENTION

This invention relates to the field of storage boxes for fishing tackle and more particularly to a unique type of storage device for spinner baits. While many types of tackle boxes are known in the art, none of these boxes deal effectively with the particular problems encountered in storing spinner baits and lures.

A number of ordinary tackle boxes are known in the fishing art. The most common type of tackle box involves a hinged box having compartmented trays therein. These compartmented trays are often made as separate sliding drawers or as hinged trays or as removable and compartmented sections. A problem arises in the use of these types of convention tackle boxes for spinner baits and lures. For example, it is often difficult to separate several spinner baits and lures which have been all placed in one compartment. The hooks and other parts of the lures tend to become entangled and are difficult to separate. When a quick change of the spinner bait or lure is needed, these entanglements prohibit easy access to a single spinner bait or lure. It is an object of this invention to provide separate compartments for each spinner bait or lure and thus to eliminate the problem of entangling more than one spinner or lure.

Another problem not solved by the prior art involves the need to view each individual spinner bait or lure before attaching it to the fishing line. One attempt to solve this problem is found in U.S. Pat. No. 4,691,469. That patent, issued to Alsobrook, involved a soft packet comprising various see-through compartments which are attached to a soft rolled backing. This soft packet of fishing lures provides good access to the lure and a high degree of visibility of the lure since the front cover of each compartment is clear. However, this soft pack of lures is necessarily quite limited in the number of lures that may be carried since the soft packet must be rolled around itself when not in use.

The instant invention provides a large capacity for carrying a great number of spinner baits or lures by utilizing the best aspects of the conventional tackle box and the see-through compartments of the soft packet. It is an object of this invention to provide a container for a large quantity of spinner baits or lures while also enabling the fisherman to readily view the spinner bait or lure sought.

Another problem encountered in the prior art is the proper organization of the lures. The lures may be categorized according to the type of spinner bait or lure and also as to the color of the spinner bait or lure. It is an object of this invention to provide a quick and readily apparent means of categorizing spinner baits or lures according to the type of lure or to the color or to any other suitable categorization desired by the fisherman.

It is further an object of this invention to provide a highly visible, compartmented, easily accessible, and simply categorized fishing tackle bait box and storage system for storing spinner baits and lures.

BRIEF DESCRIPTION OF THE PREFERRED EMBODIMENT

This invention comprises a hinged box which is essentially rectangular in cross section. The box is much longer than it is wide and provides a number of compartmented ridged slots in which the spinner baits or lures may be individually contained. Each separate spinner bait or lure is placed in a thin essentially rectangular packet. The top of the packet is open for easy insertion and withdrawal of each individual lure. The front of each packet comprises a clear plastic cover. The back of each packet is made of a stiff type of material. To use the device, a fisherman simply inserts an individual spinner bait or lure into each of the packets supplied with the device. Each packet is then slipped into a ridged slot within the box. The packets may be conveniently categorized by the use of small tabbed index cards placed at the appropriate place in the outer shell. The lures may be removed by removing any individual packet and the lure therefrom. When it is desired to change lures, the fisherman simply inserts the old lure into the packet and replaces the packet in its proper place. The new lure and packet are then withdrawn and used. In carrying the lures, one simply shuts and latches the box and carries it conveniently by an upper handle. As many as thirty spinner baits or lures may be accommodated in each such device.

BRIEF DESCRIPTION OF THE DRAWINGS

FIG. 1 is a perspective view of the outer shell and packet.

FIG. 2 is a detailed view of the device showing a number of packets in place in the container.

FIG. 3 shows a front view of the tabbed index card used to separate the individual packets.

DETAILED DESCRIPTION OF THE PREFERRED EMBODIMENT

The carrying case or outer shell of the current device comprises an essentially rectangular bait box such as is commonly known in the art. As shown in FIG. 1, the preferred embodiment comprises a lower outer shell 1 having an essentially rectangular cross section and an upper lid 2. The lid may be hingedly attached to the lower outer shell by conventional hinges 3. It is contemplated that the most desired embodiment of this invention would comprise an extruded plastic lower shell and lid hingedly connected. Plastic is both durable and essentially water resistant as well as quiet and light weight. However, in practicing this invention a metal outer shell and lid would also be within the contemplation of the instant device. The upper lid 2 may be secured to the lower outer shell 1 by means of a standard latch 4 as shown in FIG. 1.

The lower outer shell has end walls 5 and 5', a front vertical wall 6 and a rear vertical wall 6'. The vertical walls have a plurality of corresponding front vertical ribs 7 and rear vertical ribs 7'. These corresponding vertical ribs extend the length of the vertical walls and form individual packet spaces 8.

The individual spinner bait packets comprise, essentially, a stiff back portion 9 and a pliable clear front portion 10. The stiff back 9 and the clear front portion 10 forms a lure-receiving pocket. The front and back portions are permanently attached to each other along the sides and bottom. The pliable clear front portion may be attached to the stiff back by means of stitching, gluing, or any other suitable method of secure attachment. The individual packet 11 thus formed is of a size such that the width of the packet is essentially identical to the width of the end walls of the lower outer shell. In order to store a spinner bait 12 one simple inserts the spinner bait through the mouth 13 of the packet 11. The individual packet 11 may then be inserted into an appropriate individual packet space 8. Since the individual packet 11 has a stiff backing 9, the packet will stand in an essentially vertical position relative to the lower outer shell.

As best shown in FIG. 2, a number of spinner bait packets 11 may thus be lined up in a vertical row. In the preferred embodiment, these individual packets would be approximately 3½" by 6". However, any convenient size packet and corresponding packet spaces may be utilized in the systematic categorization and storage of spinner baits and lures. The vertical ribs (7 and 7') are spaced apart so as to create individual packet spaces which are approximately one-half inch wide. Each vertical rib extends approximately one-eighth inch from the inner surface of each vertical wall to form the individual packet spaces 8. The box is dimensioned so that the lid may conveniently close down very near the top of the packets, thus securing the individual packets in their proper position.

Should the fisherman desire to categorize and systematize his individual packets according to color, type lure, or any other suitable separation of packets, he needs only to insert a tabbed index card 14 as shown in FIG. 3. This tabbed index card 14 has a width 15 of approximately the same width as the lower outer shell. The index card thus snugly fits into an individual packet space and may be used to demark and categorize the individual spinner bait packets. The lid 2 of the spinner bait box and storage unit may have a handle attached thereto for easy carrying of the unit.

It is within the contemplation of this invention that the spinner bait box be manufactured as a separate spinner box unit containing the vertical ribs and individual spinner bait packets as aforesaid. However, it is within the contemplation of this invention that the lower outer shell 1 be manufactured so as to fit completely inside another ordinary and conventional tackle box currently in use as an insert. In this application, the lower outer shell and vertical ribs would be present and would be filled with individual spinner bait packets as above described. This special spinner bait storage insert may be used to store spinner baits and lures in a manner similar to that above described. However, the lower outer shell would not be an independent unit but would fit inside a standard and conventional bait box.

As can be seen from the foregoing specification, the instant spinner bait box and storage system enables a fisherman to store a large number of spinner baits and lures individually so as to keep them from becoming entangled with one another. The clear front cover of the individual packets allows the fisherman to quickly view the size, shape, and color of the individual spinners and lures required in the fishing art. The tabbed index cards and the unique method of storing the individual packets enables the fisherman to categorize spinner baits according to his particular fishing expertise. Should it become necessary to re-categorize the spinner baits and lures according to a different color scheme, or a different type of fish, or a different fishing environment, the fisherman simply rearranges the order in which the individual packets are placed in the packet spaces and adds the appropriate tabbed index cards. From the foregoing, it can be seen that many problems heretofore encountered in the field of fishing have been solved by this simple yet unique method of storing spinner baits and lures.

Having completely described my new invention, I claim:

1. A spinner bait box, comprising:
    (a) an outer shell having front and rear vertical walls, end walls and an upper lid hingedly attached to said rear wall, wherein said front and rear walls have a plurality of corresponding vertical ribs therein which form individual packet spaces; and
    (b) a plurality of individually removable spinner bait packets, wherein each packet comprises a stiff back portion and a pliable, expandable, clear front portion, said back and front portions being permanently attached along the sides and bottom thereof and forming a spinner bait receiving compartment, each of said packets being located within one of said packet spaces.
    whereby said packets are secured in place by said ribs and said lid when closed and whereby a plurality of spinner bait lures may be stored, interchangeably categorized and conveniently viewed.

2. A spinner bait box as in claim 1, whereby each packet may be viewed in turn by advancing the packet forward one packet space and repeating said procedure for each successive packet.

3. A spinner bait box as in claim 1, wherein the individual packet spaces are one-quarter inch to three-quarters inch wide.

4. A spinner bait box as in claim 1, further comprising tabbed index cards which are placed in packet spaces, whereby said packets may be categorized.

5. A spinner bait box as in claim 1, wherein at least thirty spinner bait packets are located within said shell.

* * * * *